United States Patent

Killough, Jr.

[11] 3,974,397
[45] Aug. 10, 1976

[54] MULTI-PHASE RECTIFIER SYSTEM

[75] Inventor: Joseph R. Killough, Jr., Des Plaines, Ill.

[73] Assignee: S & C Electric Company, Chicago, Ill.

[22] Filed: Apr. 1, 1975

[21] Appl. No.: 563,986

[52] U.S. Cl. .................................. 307/82; 307/43; 307/83; 321/27 R; 321/43
[51] Int. Cl.² ........................................ H02J 3/38
[58] Field of Search ................. 321/8, 27 R, 47, 48, 321/43; 307/43, 45, 52, 70, 72, 82, 83

[56] References Cited
UNITED STATES PATENTS

| | | | |
|---|---|---|---|
| 2,759,140 | 8/1956 | Lewis | 321/27 R |
| 3,535,603 | 10/1970 | Droste et al. | 321/27 R |

*Primary Examiner*—Gerald Goldberg

[57] ABSTRACT

Disclosed is a multi-source rectifier system for providing DC power to a load from a plurality of high impedance AC electrical sources connected to a multisource high voltage transmission system. The system comprises a parallel arrangement of high impedance AC current sources each connected in series with a respective bridge rectifier, the positive output terminals of all bridge rectifiers are connected in parallel to the positive side of a load. The negative output terminals of all bridge rectifiers are connected in parallel to the low side of the load. The individual high impedance AC current sources are completely isolated from one another through their series connected bridge rectifiers, making it possible to simultaneously supply current from more than one high impedance AC current source to the load without significant circulating currents among the sources. The parallel arrangement of high impedance AC current sources connected through bridge rectifiers to the load provides direct current electrical power to the load notwithstanding phase differences between various high impedance AC current sources. A multisource rectifier arrangement when connected to a high impedance AC current source, will yield a level of DC output power greater than what at first might be expected. Only one rectifier may conduct at any given time when voltage sources are used and when the load is resistive, for example, the rectifier conduction angle cannot exceed 120° (60° per half cycle). This is the result of forced commutation of the rectifier by the voltage source. When a current source, e.g. a high impedance AC current source, is used however, the conduction angle with a resistive load, for example, can increase theoretically to 360° (180° per half cycle) and several rectifiers can conduct simultaneously. Further, the failure of any number fewer than all of the high impedance AC current sources will not interrupt power to the load.

24 Claims, 1 Drawing Figure

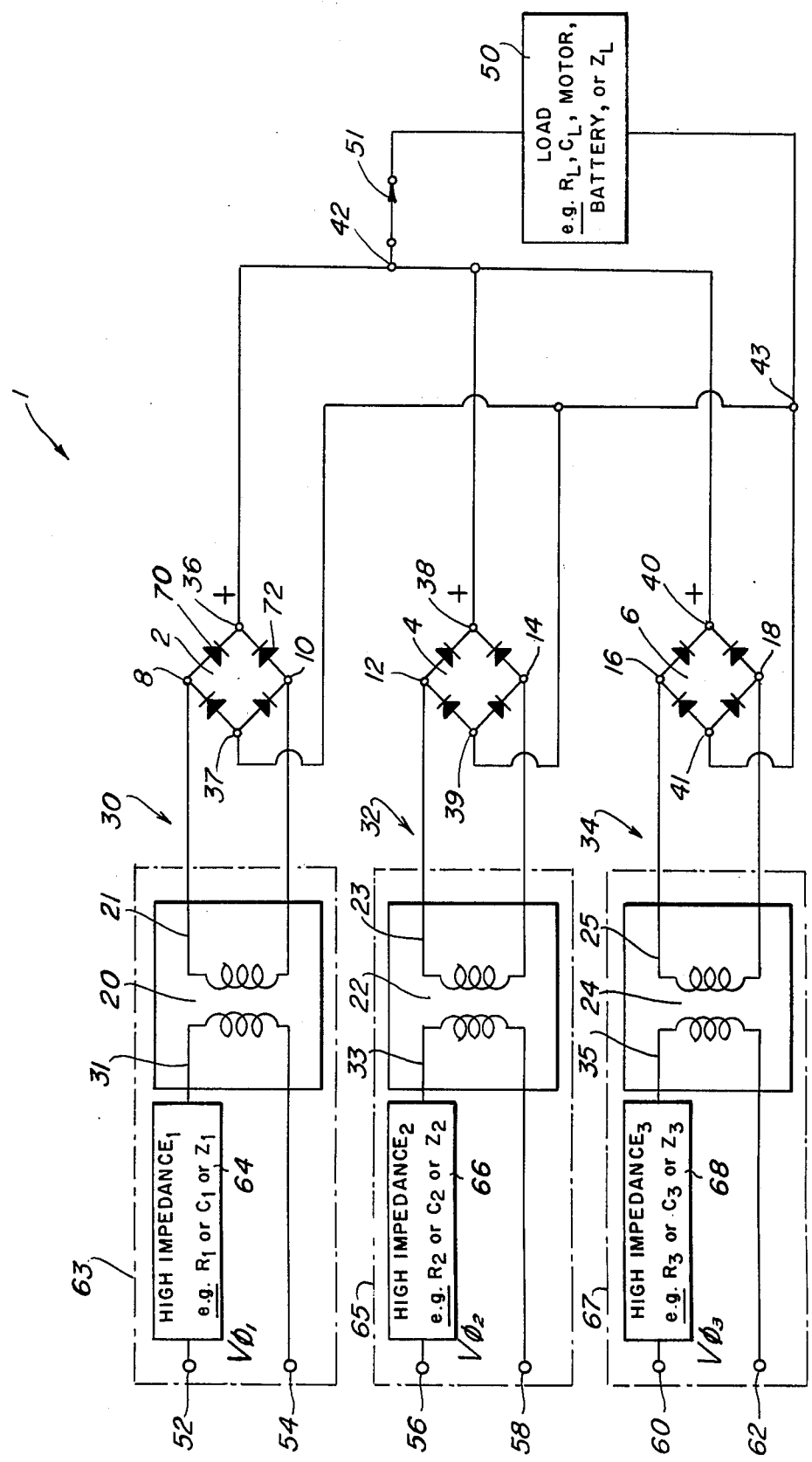

3,974,397

MULTI-PHASE RECTIFIER SYSTEM

BACKGROUND OF THE INVENTION

1. Field of the Invention

The present invention relates to high impedance power supply systems and more particularly to the use of multi-phase rectifiers in series with high impedance AC current sources connected to a multi-source high voltage transmission system to provide DC current to a load or auxiliary apparatus such as a motor, light or capacitor.

2. Description of the Prior Art

Various types of power supply systems powered by high voltage transmissions systems are well known in the art. For example, conventional high impedance AC sources are used to supply power directly to the load. However, for such systems the power consumption of the load must be small in order to match the power output capabilities of such a single high impedance AC source. Batteries have also been used as a direct source of DC current for load operation. Batteries, however, present considerable cost and space disadvantages and require freqent maintenance and recharging.

The power supply arrangements of the prior art generally consist of one-to-one power source-load combinations or pairings characterized by current flow to the load which is restricted to the output capabilities of the single power source of each pairing and further characterized by the complete loss of power to the load with the failure of the power source serving that load. Consequently, the reliability and dependability of prior art systems is unsatisfactory for some applications. In addition, in prior art devices complete isolation among power source-load pairings is commonly employed to avoid circulating currents among power sources which would otherwise arise because of differences in phase and magnitude of output voltages of the various power sources used.

Thus, it would be a desirable advance in the art to provide a multiple source power supply arrangement characterized by an increase in power supplied to the load, and by continuous direct current flow to the load notwithstanding the phase relationships among power sources and notwithstanding the loss of any number fewer than all of the power sources.

BRIEF DESCRIPTION OF THE INVENTION

A multi-source rectifier system for providing DC power to a load from a plurality of high impedance AC current sources comprises a parallel arrangement of high impedance AC current sources each having a rectifier means electrically connected in series between its output terminals and common high and low load terminals. The rectifier means employed are preferably of the full-wave diode bridge type each having input terminals and positive and negative output terminals, but may be of other types including other double or multiple input full-wave or half-wave rectifier arrangements. The rectifiers are connected to the high and low common load terminals such that the positive output terminals of all rectifiers are connected to the high common load terminal and the negative output terminals of all rectifiers are connected to the low common load terminal which, if desired, may be grounded. The load to be powered is connected between the high common load terminal and the low common load terminal so that voltage developed by the rectifier system is impressed across the load and DC current flowing from the rectifier system is fed to the load. The load may be of any type including without limitation single or multiple solid state control circuits, capacitors, batteries, motors or parallel combinations thereof.

In operation, the AC current provided by each high impedance AC current source is rectified by the rectifier connected at the source output terminals, the positive direct current being fed through the rectifier positive output terminal to the high common load terminal. The negative output terminal of each is connected to the low common load terminal and, if desired, to ground. In a like manner, the positive direct current of all other sources is fed to the high common load terminal. The negative output terminals of all rectifiers are connected to the low common load terminal. The load, e.g. motor, light or capacitor, is connected for operation between the high and low common load terminals. Each high impedance AC current source provides DC current to the load only when the load voltage ($V_L$) is lower than the high impedance AC current source output voltage ($V_S$) provided at the input terminals of its bridge rectifier i.e. when $V_S - V_L > 0$. Thus, when $V_L$ is equal to or greater than any particular high impedance AC current source output voltage $V_S$, the back-to-back rectifiers of the bridge rectifier connected to that particular source are reverse biased and no DC current is permitted to flow to the load from that particular source.

The instantaneous amplitude and wave-form of the positive DC current developed by any one of the plurality of high impedance AC current source-rectifier branches of the parallel arrangement will, of course, be a function of the phase, amplitude and wave-form of the high impedance AC current source in that branch. The net effect of the contributions of all the high impedance AC current source-rectifier branches of the parallel arrangement is a DC voltage formed as a result of the DC currents contributed by each branch through a fixed load. The DC current through the load is the sum of the DC currents contributed by each branch. The DC power delivered to the load by the plurality of high impedance AC current sources is characteristically much greater than the power provided by a single high impedance AC current source. For example, in a three source rectifier system such as that resulting from use of three high impedance AC current sources separated in phase by the customary 120 degrees the DC power is roughly 2.5 to 3 times that provided by a single high impedance AC current source. Further, if voltage sources are combined in a three phase rectifier arrangement, one could only expect an increase in power by a factor of approximately 70% which is substantially less than the increased power of the present invention.

Circulating currents among high impedance AC current sources are essentially eliminated by the back-to-back rectifier arrangement at the positive output terminal of each bridge rectifier. As "seen" by other high impedance AC current sources, one of these back-to-back rectifiers is always reverse biased while the other is either conducting or reverse biased. Accordingly, the flow of current "into" the high impedance AC current source of any particular branch is limited to the negligible reverse leakage current of the rectifiers used, a current which, in most cases, is on the order of microamps.

Thus, it is a primary object of the present invention to provide a DC power supply system, using a plurality of high impedance AC current sources, which is capable of supplying greater power to a load than available from a single high impedance AC current source.

It is a further object of this invention to provide a DC power supply system which is fully operational notwithstanding the phase relationships among high impedance AC current sources used.

It is yet another object of this invention to eliminate the need for source-load pairings and complete isolation and provide a DC power supply system with functional reliability notwithstanding the failure of a number fewer than all of the high impedance AC current sources used.

It is still another object of this invention to provide a completely self-contained source of DC power which eliminates the need for external battery or auxiliary power sources.

It is another object of the present invention to provide a charging current source for one or more capacitors or batteries characterized by increased charging current thereby diminishing the time required for charging and recharging while increasing the reliability and dependability of the system at a considerable saving of cost and space over batteries and conventional power sources.

It is yet a further object of this invention to provide a low cost yet reliable DC power supply system which can be connected to derive its operating power from high impedance AC current sources connected for operation to the three distinct phase lines of a conventional three phase high voltage transmission line.

These and other objects, advantages and features of the invention will be apparent from the following description of the invention, an exemplary and preferred embodiment of which is illustrated in the appended drawing.

DESCRIPTION OF THE DRAWINGS

The drawing is a schematic representation of a three-source embodiment of the invention showing a load and three high impedance AC current sources each comprising a high impedance in series with the primary winding of an isolation transformer.

DESCRIPTION OF THE PREFERRED EMBODIMENT

With reference to the drawing, a preferred embodiment of multi-source rectifier system 1 comprises rectifier bridges 2, 4 and 6 connected in series through their respective input terminals 8 and 10, 12 and 14, 16 and 18 across the secondary windings 21, 23 and 25 of isolation transformers 20, 22 and 24 to form circuit branches 30, 32 and 34. The positive output terminals 36, 38 and 40 and the negative output terminals 37, 39 and 41 of diode bridge rectifiers 2, 4 and 6 are connected respectively to high common load terminal 42 and to low common load terminal 43 (as shown) to form a parallel circuit comprising circuit branches 30, 32, 34 and high and low common load terminals 42 and 43. The auxiliary apparatus or load, e.g. the resistive load typical of a solid state control circuit or light to be powered by multi-source rectifier system 1, is shown for purposes of illustration in block form as load 50 which is connected for operation between high common load terminal 42 and low common load terminal 43. The load 50 may be of any type including without limitation single or multiple solid state control circuits, capacitors, batteries, motors or parallel combinations thereof.

The respective input terminals 52, 56 and 60 are connected to one side of primary windings 31, 33, 35 of isolation transformers 20, 22 and 24 respectively through high impedances 64, 66, 68 (shown as blocks labeled High Impedance 1, High Impedance 2 and High Impedance 3) and to three separate AC high voltage transmission lines (not shown). Similarly, terminals 54, 58 and 62 are connected to the other side of primary windings 31, 33 and 35 and are normally grounded so that current flows through impedance 64, 66 and 68 and primary winding 31, 33, and 35. These circuits form high impedance AC current sources 63, 65 and 67. The high impedance AC current sources 63, 65 and 67 may be high voltage sensing devices such as that disclosed in a copending application for VOLTAGE SENSING DEVICE FOR USE AT HIGH VOLTAGE, Ser. No. 564,109, assigned to the same assignee as the present invention, and illustrated schematically in FIG. 7 of that application wherein the series high impedance is a capacitor and the isolation transformer is a step-down transformer. Further, high impedance AC current sources 63, 65 and 67 may be a conventional potential device arrangement wherein impedances 64, 66, and 68 are capacitors. Conventional resistive potential devices may also be used as high impedance AC current sources wherein impedances 64, 66, and 68 are large magnitude resistors. As will hereinafter be explained more fully, the phase relationships among high impedance AC current sources 63, 65 and 67 is immaterial to the functional operation of multi-source rectifier system 1. Isolation transformers 20, 22 and 24 may, for example, be connected respectively through high impedances 64, 66 and 68 between ground and one of the three phase lines of a conventional high voltage three-phase power transmission system.

Referring to circuit branch 30, operation of multi-source rectifier system 1, can be explained as follows. AC current is caused to flow through high impedance 64 and the primary winding 31 of isolation transformer 20 as voltage appears on the transmission lines. The magnitude of AC current through high impedance 64 is dependent upon the ratio of the magnitude of transmission line voltage $V_{g1}$ to the magnitude of impedance 64. Current flow in the primary winding of isolation transformer 20 gives rise to an induced AC current on the secondary winding 21 and at the output of high impedance AC current source 63. That induced AC current is applied to bridge rectifier 2 at input terminals 8 and 10. The induced AC current available at the output of high impedance AC current source 63 is directly proportional to the current in the primary winding 31, and, therefore, at any given time, the voltage across the secondary winding 21, fluctuates to a value that will maintain current flow to the load at essentially a fixed or constant RMS level. Unlike voltage sources that provide essentially fixed or constant RMS output voltages, irrespective of the size of the load, high impedance AC current sources of the type shown in FIG. 1 supply essentially fixed or constant RMS current, irrespective of the size of the load. This results because high impedances 64, 66 and 68 are much greater than the primary reflected impedance of load 50; and therefore, determine the current flowing through the primary windings 31, 33 and 35 and therefore the induced current in secondary windings 21, 23 and 25. Thus, the output voltage of high impedance AC current source 63, for example, can be expected to increase or decrease in amplitude since the current flowing through bridge rectifier 2 is at all times proportional to the current in the primary winding 31. In high impedance AC current sources 63, 65, and 67 the output voltage fluctuates to assure flow of the induced current irrespective of the magnitude of the load. This characteristic of high impedance AC current sources 63, 65 and 67 is essential to operation of the present invention and, for reasons explained more fully below, use of multi-source high impedance AC current sources gives rise to a greater power output efficiency than could be realized by use of a single high impedance AC current source.

Referring further to circuit branch 30, bridge rectifier 2 provides rectified (DC) current to high common load terminal 42 when either of its diodes 70 or 72 are forward biased i.e., when the amplitude of load voltage $V_L$ on high common load terminal 42 is less than the amplitude of the output voltage of high impedance AC current source 63 at either of bridge rectifier 2 input terminals 8 or 10. When the amplitude of load voltage $V_L$ on high common load terminal 42 is equal to or greater than the amplitude of the output voltage of high impedance AC current source 63 at input terminals 8 and 10, diodes 70 and 72 are both reverse biased or "off" and bridge rectifier 2 is non-conducting or off.

Circuit branches 32 and 34 operate in a manner identical to that described above with reference to circuit branch 30, with the positive output terminals 36, 38, and 40 of bridge rectifiers 2, 4 and 6 linked in parallel to high common load terminal 42. Thus, the voltage on high common load terminal 42 is equal to the voltage at output terminals 36, 38 and 40. The direct current flowing to the load 50 through high common load terminal 42, however, is the sum of the direct currents provided at output terminals 36, 38 and 40.

It might be assumed since high impedance AC current sources 63, 65 and 67 may be "out of phase", that the high impedance AC current source with the greatest instantaneous output voltage amplitude would provide all current flow to high common load terminal 42 and simultaneously bias back-to-back diodes at the positive output terminals of other bridge rectifiers to their non-conducting or off state, thereby preventing multi-source power-to-load contribution or simultaneous power source operation. Such would, of course, be the case if voltage sources were used rather than high impedance AC current sources. However, since the present invention makes use of high impedance AC current sources, the current supplied to the load at any given time is a function of the input currents to the high impedance AC current sources. Thus, if, at a given time, current is flowing in more than one primary winding, a current will be induced in the corresponding secondary winding, and as a consequence, the output voltages of those high impedance AC current sources will fluctuate to substantially comparable levels, permitting the simultaneous forward biasing of more than one of the corresponding bridge rectifiers with the consequent flow of current to the load from more than one of high impedance AC current sources 63, 65 and 67.

The high impedance AC current source-load interaction and the multi-phase operation, characteristic of the present invention, are best illustrated by example. Referring to the drawing, assume that at time $T_1$, the instantaneous amplitude of the input voltage of high impedance AC current source 63 is sufficient to cause a current to flow in the primary winding 31 that induces a current of 1 ampere in secondary winding 21, and at the same instant, the amplitude of corresponding input voltages of high impedance AC current sources 65 and 67 are such that currents of one-half ampere and zero ampere respectively are induced on secondary windings 33 and 35. Assume further that a normally open switch 51 in series with load 50 is closed. The load voltage $V_L$ across load 50 is equal to the current times the impedance of load 50. Assuming, for example, that load 50 is a 100 ohm resistor, the voltage $V_L$ will be 100 times the total current supplied or 100 ohms times 1.5 amps = 150 volts. Thus, the voltage across secondary windings 21 and 23 will fluctuate to a value slightly above 150 volts so that bridge rectifiers 2 and 4 are biased "on" and the total induced current flows to the load 50. Since no current is induced in secondary winding 25, the secondary winding voltage will be less than 150 volts, i.e. the voltage across load 50, thereby biasing bridge rectifier 6 off. However, this will occur theoretically only when the voltage on the primary crosses the zero axis.

As can be seen, in a theoretically perfect circuit, each bridge rectifier 2, 4 and 6 could be conducting throughout the 360 degree angle of each cycle of input voltage to high impedance AC current sources 63, 65, 67 since, except for zero axis crossings, currents will flow in primary windings 31, 33 and 35 and corresponding currents will be induced in secondary windings 21, 23, and 25. If a voltage source were used, each bridge rectifier could conduct only through an angle of 120° (i.e., 60° per half cycle) since each of the other voltage sources would increase in output voltage to the point where bridge rectifiers would be biased off.

In actual practice it has been found that a three source arrangement in accordance with the present invention can deliver 2.5 to 3 times more power than that which could be supplied by a single high impedance AC current source. In a three phase rectifier arrangment employing voltage sources, it would be expected that the available power would increase by only a factor of approximately 1.7 times the power available from a single voltage source arrangement.

From the foregoing it can be seen that the present invention provides a supply system in which power is simultaneously provided to the load from a plurality of high impedance AC current sources. Because of the nature of such sources, more than one source can supply current to the load and correspondingly, more power is available notwithstanding the phase differences between the respective high impedance AC current source input voltages. It will be apparent to those skilled in the art that the power flowing to the load in the multi-source rectifier system of the present invention is greater than the power flowing to the load from a single high impedance AC current source.

Circulating currents in multi-source rectifier system 1 among high impedance AC current sources 63, 65 and 67 are eliminated by the back-to-back operation of the diode pairs connected respectively to positive output terminals 36, 38 and 40. Referring to current branch 30, the diode pair connected to positive output terminal 36 comprises diodes 70 and 72. Depending on the induced current and the amplitude and polarity of the instantaneous voltage at the output of high impedance AC current source 63 and upon the instantaneous amplitude of load voltage $V_L$ on high common load terminal 42, one of diodes 70 and 72 will, at any point of time, be reversed biased or off and the other of diodes 70 and 72 will be either forward biased and conducting or reverse biased and off. Accordingly, direct current flowing along high common load terminal 42 toward high impedance AC current source 63, for example, is prevented from passing through bridge rectifier 2 by the action of diodes 70 and 72 since, by the action of back-to-back diodes 70 and 72, direct current is either flowing from positive output terminal 36 or both diodes 70 and 72 are reverse biased and no current is permitted to flow into positive output terminal 36. Theoretically, both diodes 70 and 72 would be biased off only when the induced current in secondary winding 21 is zero; as the input voltage to high impedance AC current source 63 crosses the zero axis. At this time, if diodes 70 and 72 were not in the circuit, a short circuit situation would be created through secondary winding 21 causing the current supplied by source 22 and 24 to flow through secondary winding 21 rather than load 50. Thus, circulating currents are undesirable since they divert current from the load. In a similar manner, the diode pairs at positive output terminals 38 and 40 respectively of bridge rectifiers 4 and 6 prevent circulating current from flowing into circuit branches 32 and 34. As a consequence of the back-to-back operation of diode pairs connected to positive output terminals 36, 38 and 40, the problem of circulating current among various sources commonly encountered in multi-source power supply systems of the prior art is obviated in the present invention.

It will be readily recognized by those skilled in the art that a three source conventional full wave rectifier could be used instead of individual bridge rectifiers 2, 4, and 6. For example, any of the rectifier arrangements shown on page 28–16 of Section 28–43 of the "Standard Handbook for Electrical Engineers" by Fink and Carroll, Tenth Edition, McGraw-Hill Book Company could be utilized instead of bridge rectifiers 2, 4, and 6. However, it should be recognized that some form of voltage limiting means will have to be used if a half-wave rectifier is employed since during the non-conducting half cycle, the secondary voltage will increase to an upper limit of the input line voltage.

It will also be apparent that non-synchronous sources could be used to supply power to high impedance AC current sources 63, 65 and 67 without adversely affecting the operation of the invention.

It should be expressly understood that various modifications, variations, and changes in the structure of the embodiment illustrated herein may be made without departing from the spirit and scope of the present invention as defined in the appended claims.

I claim:

1. A multi-source rectifier system for providing DC power to a load comprising:
   at least two high impedance AC current sources, said high impedance AC current sources each having first and second output lines;
   high and low common load terminals for carrying power to a load connected between said high common load terminal and said low common load terminal;
   rectifier means, said rectifier means each having first and second input terminals and positive and negative output terminals, one of said rectifier means connected between each of said high impedance AC current sources and said high and low common load terminals such that the said first and second output lines of each of said high impedance AC current sources are connected to the first and second input terminals of one of said rectifier means aand said positive and negative output terminals of each of said rectifier means are connected respectively to said high and low common load terminals to provide direct current to said high and low common load terminals which in turn carry power to a load connected between said high common load terminal and said low common load terminal.

2. A multi-source rectifier system as claimed in claim 1 wherein said rectifier means comprises a plurality of bridge rectifiers each having first and second input terminals and positive and negative output terminals.

3. A multi-source rectifier system as claimed in claim 2 wherein two rectifiers of each of said bridge rectifiers are oriented back-to-back in series and connected at their common terminal to said positive output terminal such that when an AC current is applied at the input terminals of a given bridge rectifier and the instantaneous amplitude of AC voltage applied at the first and second input terminals is greater than the instantaneous amplitude of voltage at the positive output terminal, a direct current flows from the positive output terminal of that bridge rectifier.

4. A multi-source rectifier system as claimed in claim 3, wherein at any given point in time one of the two back-to-back rectifiers connected at their common terminal to said positive output terminal is reverse biased and the other of the two back-to-back rectifiers is either conducting current to the positive output terminal or is reverse biased so that at all times the flow of current into the respective bridge rectifiers is limited to the reverse leakage current of the rectifiers used.

5. A multi-source rectifier system as claimed in claim 1 wherein said rectifier means comprises a plurality of half-wave rectifiers.

6. A multi-source rectifier system for providing DC power to a load comprising:
   at least two high impedance AC current sources comprising a plurality of step down transformers each connected in series through a high impedance to independent high voltage AC transmission lines;
   high and low common load terminals for carrying power to a load connected between said high common load terminal and said low common load terminal;
   rectifier means, said rectifier means each having input terminals and positive and negative output terminals, one of said rectifier means connected between each of said high impedance AC current sources and said high and low common load terminals such that the said first and second output lines of each of said high impedance AC current sources are connected to the input terminals of one of said rectifier means and said positive and negative output terminals of each of said rectifier means are connected respectively to said high and low common load terminals to provide direct current to said high and low common load terminals which in turn carry power to a load connected between said high common load terminal and said low common load terminal.

7. A multi-source rectifier system as claimed in claim 6 wherein the high impedances of said high impedance AC current source are capacitors.

8. A multi-source rectifier system as claimed in claim 6 wherein the high impedances of said high impedance AC current source are resistors.

9. A multi-source rectifier system as claimed in claim 6 wherein said independent high voltage AC transmission lines are out of phase with respect to one another.

10. A multi-source rectifier system as claimed in claim 9 wherein the high voltage AC transmission lines comprise the three phase lines of a conventional three-phase high voltage AC transmission system.

11. A three-source rectifier system for providing DC power to a load from conventional three-phase high voltage AC transmission lines, comprising:
three high impedance AC current sources, said high impedance AC current sources each having first and second output lines;
high and low common load terminals for carrying power to a load connected between said high common load terminal and said low common load terminal;
three rectifier means, said rectifier means each having first and second input terminals and positive and negative output terminals, each one of said three rectifier means connected between a corresponding one of said three high impedance AC current sources and said high and low common load terminals such that the said first and second output lines of each of said three high impedance AC current sources are connected to the first and second input terminals of one of said three rectifier means and the positive and negative output terminals of each of said three rectifier means and the positive and negative output terminals of each of said three rectifier means are connected respectively to said high and low common load terminals to provide direct current to said high and low common load terminals which in turn carry power to a load connected between said high common load terminal and said low common load terminal.

12. A three-source rectifier system as claimed in claim 11 wherein each of said three rectifier means comprises a bridge rectifier having first and second input terminals, a positive output terminal and a negative output terminal.

13. A three-source rectifier system as claimed in claim 12 wherein two rectifiers of each of said bridge rectifiers are oriented back-to-back in series and connected at their common terminal to said positive output terminal such that when an AC current is applied at said first and second input terminals of a given bridge rectifier, and the instantaneous amplitude of AC voltage applied at said first and second input terminals is greater than the instantaneous amplitude of voltage at said positive output terminal, direct current is presented at said positive output terminal.

14. A three-source rectifier system as claimed in claim 13 wherein at any given point in time one of the two back-to-back rectifiers connected at their common terminal to said positive output terminal is reverse biased and the other of the two back-to-back rectifiers is either conducting current to said positive output or is reverse biased so that at all times the flow of current into the bridge rectifiers is limited to the reverse leakage current of the rectifiers used.

15. A three-source rectifier system as claimed in claim 11 wherein said three rectifier means each comprise half-wave rectifiers.

16. A three-source rectifier system for providing DC power to a load from conventional three-phase high voltage AC transmission lines, comprising:
three high impedance AC current sources, each having a stepdown transformer connected in series through a high impedance to one of the independent high voltage AC transmission lines of a conventional three-phase power transmission system;
high and low common load terminals for carrying power to a load connected between said high common load terminal and said low common load terminal;
three rectifier means, said rectifier means each having input terminals and positive and negative output terminals, one of said three rectifier means connected between each of said three high impedance AC current sources and said high and low common load terminals such that the said first and second output lines of each of said three high impedance AC current sources are connected to the input terminals of one of said three rectifier means and the positive and negative output terminals of each of said three rectifier means and the positive and negative output terminals of each of said three rectifier means are connected respectively to said high and low common load terminals to provide direct current to said high and low common load terminals which in turn carry power to a load connected between said high common load terminal and said said low common load terminal.

17. A three-source rectifier system as claimed in claim 16 wherein said high impedance of at least one of said three high impedance AC current sources is a capacitor.

18. A three-source rectifier system as claimed in claim 16 wherein said high impedance of at least one of said three high impedance AC current sources is a resistor.

19. A multi-source rectifier system for providing DC power to a load comprising:
at least two high impedance AC current sources, said high impedance AC current sources each having first and second output lines;
high and low common load terminals for carrying power to a load comprising at least one battery connected between said high common load terminal and said low common load terminal;
rectifier means, said rectifier means each having first and second input terminals and positive and negative output terminals, one of said rectifier means connected between each of said high impedance AC current sources and said high and low common load terminals such that the said first and second output lines of each of said high impedance AC current sources are connected to the first and second input terminals of one of said rectifier means and said positive and negative terminals of each of said rectifier means are connected respectively to said high and low common load terminals to provide direct current to said high and low common load terminals which in turn carry power to said load comprising at least one battery connected between said high common load terminal and said low common load terminal.

20. A multi-source rectifier system for providing DC power to a load comprising:

at least two high impedance AC current sources, said high impedance AC current sources each having first and second output lines;

high and low common load terminals for carrying power to a load comprising at least one capacitor connected between said high common load terminal and said low common load terminal;

rectifier means, said rectifier means each having first and second input terminals and positive and negative output terminals, one of said rectifier means connected between each of said high impedance AC current sources and said high and low common load terminals such that the said first and second output lines of each of said high impedance AC current sources are connected to the first and second input terminals of one of said rectifier means and said positive and negative output terminals of each of said rectifier means are connected respectively to said high and low common load terminals to provide direct current to said high and low common load terminals which in turn carry power to said load comprising at least one capacitor connected between said high common load terminal and said low common load terminal.

21. A multi-source rectifier system for providing DC power to a load comprising:

at least two high impedance AC current sources, said high impedance AC current sources each having first and second output lines;

high and low common load terminals for carrying power to a load comprising at least one motor connected between said high common load terminal and said low common load terminal;

rectifier means, said rectifier means each having first and second input terminals and positive and negative output terminals, one of said rectifier means connected between each of said high impedance AC current sources and said high and low common load terminals such that the said first and second output lines of each of said high impedance AC current sources are connected to the first and second input terminals of one of said rectifier means and said positive and negative output terminals of each of said rectifier means are connected respectively to said high and low common load terminals to provide direct current to said high and low common load terminals which in turn carry power to said load comprising at least one motor connected between said high common load terminal and said low common load terminal.

22. A multi-source rectifier system for providing DC power to a load comprising:

at least two high impedance AC current sources, said high impedance AC current sources each having first and second output lines;

high and low common load terminals for carrying power to a load comprising a parallel combination of at least one capacitor and at least one motor connected between said high common load terminal and said low common load terminal;

rectifier means, said rectifier means each having first and second input terminals and positive and negative output terminals, one of said rectifier means connected between each of said high impedance AC current sources and said high and low common load terminals such that the said first and second output lines of each of said high impedance AC current sources are connected to the first and second input terminals of one of said rectifier means and said positive and negative output terminals of each of said rectifier means are connected respectively to said high and low common load terminals to provide direct current to said high and low common load terminals which in turn carry power to said load comprising a parallel combination of at least one capacitor and at least one motor connected between said high common load terminal and said low common load terminal.

23. A multi-source rectifier system for providing DC power to a load comprising:

at least two high impedance AC current sources, said high impedance AC current sources each having first and second output lines;

high and low common load terminals for carrying power to a load comprising a parallel combination of at least one capacitor and at least one resistor connected between said high common load terminal and said low common load terminal;

rectifier means, said rectifier means each having first and second input terminals and positive and negative output terminals, one of said rectifier means connected between each of said high impedance AC current sources and said high and low common load terminals such that the said first and second output lines of each of said high impedance AC current sources are connected to the first and second input terminals of one of said rectifier means and said positive and negative output terminals of each of said rectifier means are connected respectively to said high and low common load terminals to provide direct current to said high and low common load terminals which in turn carry power to said load comprising a parallel combination of at least one capacitor and at least one resistor connected between said high common load terminal and said low common load terminal.

24. A multi-source rectifier system for providing DC power to a load comprising:

at least two high impedance AC current sources, said high impedance AC current sources each having first and second output lines;

high and low common load terminals for carrying power to a load comprising a parallel combination of at least one battery and at least one resistor connected between said high common load terminal and said low common load terminal;

rectifier means, said rectifier means each having first and second input terminals and positive and negative output terminals, one of said rectifier means connected between each of said high impedance AC current sources and said high and low common load terminals such that the said first and second output lines of each of said high impedance AC current sources are connected to the first and second input terminals of one of said rectifier means and said positive and negative output terminals of each of said rectifier means are connected respectively to said high and low common load terminals to provide direct current to said high and low common load terminals which in turn carry power to said load comprising a parallel combination of at least one battery and at least one resistor connected between said high common load terminal and said low common load terminal.

* * * * *